United States Patent [19]

Weekley

[11] Patent Number: 5,004,197

[45] Date of Patent: Apr. 2, 1991

[54] PROTECTIVE APPARATUS FOR A CHILD RESTRAINT SEAT

[76] Inventor: Karl R. Weekley, 935 Landmark, Pevely, Mo. 63070

[21] Appl. No.: 461,753

[22] Filed: Jan. 8, 1990

[51] Int. Cl.⁵ ............................................... A47C 3/02
[52] U.S. Cl. .............................. 248/188.9; 248/345.1; 297/250
[58] Field of Search ............... 248/163.1, 345.1, 346, 248/188.8, 188.9; 297/250

[56] References Cited

U.S. PATENT DOCUMENTS

| | | | |
|---|---|---|---|
| 755,345 | 3/1904 | Bent | 248/345.1 |
| 2,011,785 | 8/1935 | Vallone | 248/188.9 |
| 2,746,203 | 5/1956 | Gibas . | |
| 2,910,803 | 11/1959 | Close | 248/345.1 |
| 3,258,779 | 7/1966 | Turner | 182/230 X |
| 3,669,490 | 6/1913 | Bertolet . | |
| 4,285,543 | 8/1981 | Clark . | |
| 4,531,339 | 7/1985 | Tomaszewski et al. | 248/188.9 X |
| 4,564,237 | 1/1986 | Steifensand | 248/188.8 X |
| 4,605,265 | 8/1986 | Bessinger et al. | 248/345.1 X |

Primary Examiner—Alvin C. Chin-Shue
Attorney, Agent, or Firm—Andsel Group, Inc.

[57] ABSTRACT

An protective apparatus for the legs of a child restraint seat that is used in a vehicle is described. The protective apparatus reduces the wear or damage that could result if the legs of the child restraint seat were allowed to rest directly on the upholstery of the vehicle. The apparatus has a first base with sequentially connected C-shaped arms that form a U-shape base. The first base has a channel that is formed within the C-shaped arms and a longitudinally oriented opening that allows a portion of the legs to be placed within the channel and secured by a plurality of fastening means. There is a second base having a chamber formed by a bottom wall and three sequentially connected side walls connected to the bottom wall. There is an entrance port in the second base that allows the first base to be placed within the chamber. The side walls have an overhanging lip to secure the first base within the second base. The outside surface of the first and second base have a high coefficient of friction to reduce slippage of the bases with any surface with which they may come in contact.

9 Claims, 1 Drawing Sheet

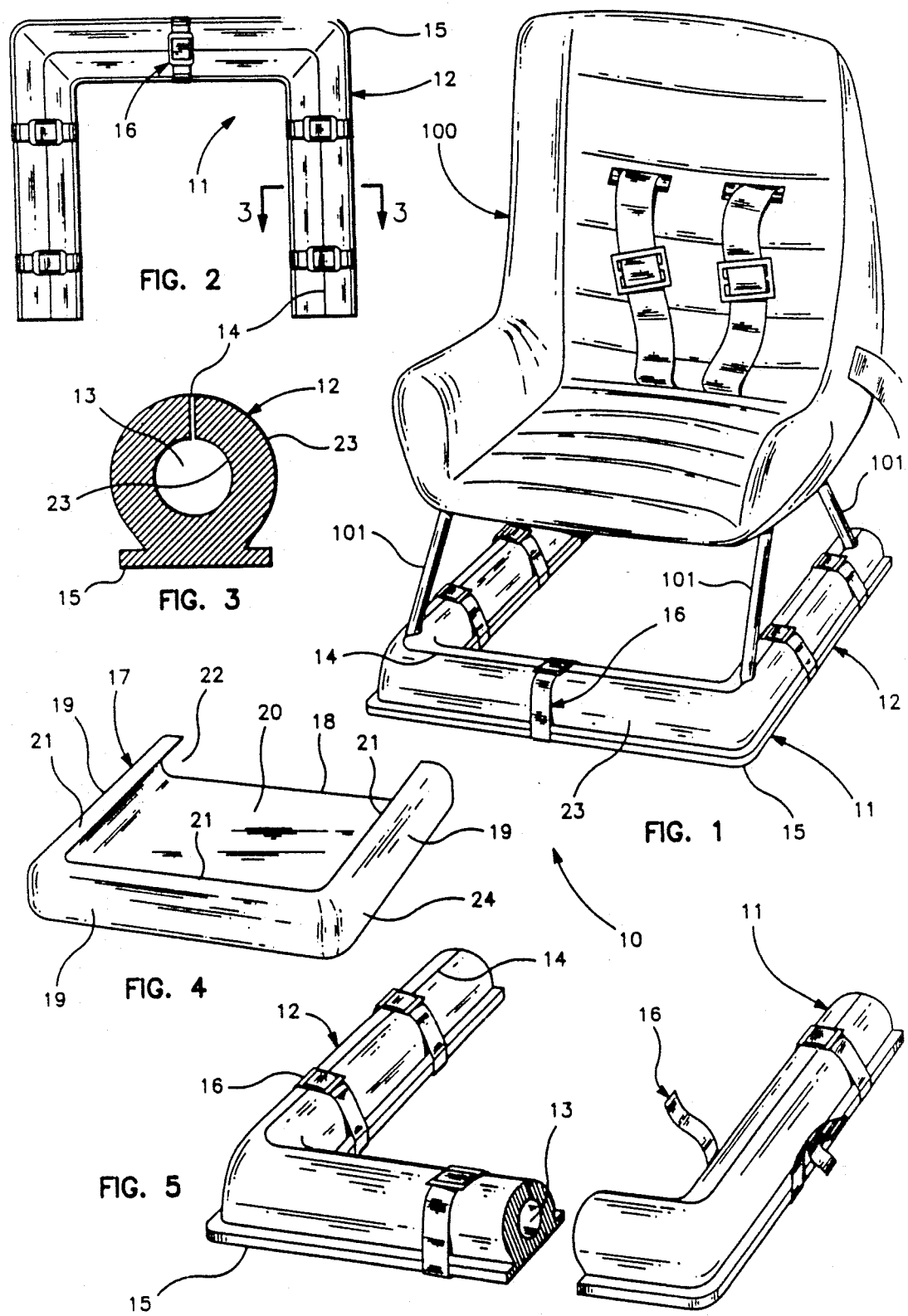

PROTECTIVE APPARATUS FOR A CHILD RESTRAINT SEAT

BACKGROUND OF THE INVENTION

1. Field of the Invention

This invention relates to a protective apparatus for the legs or base of a child restraint seat used in a motor vehicle to reduce wear and damage to the vehicle seat coverings. The apparatus is attachable to the standard configuration child restraint seat of the type shown in the drawings to illustrate the use of the apparatus. The child restraint seat is not claimed.

2. Description of the Related Art

Child restraint seats are placed on a vehicle seat and usually secured to the vehicle frame by the seat belts of the vehicle. Over a period of time, the bottom or legs of the child restraint seat can wear or abrade the surface of the vehicle seat and cause unsightly damage. In the past, various materials have been placed under the restraint seat to reduce this wear. Vehicle owners have tried towels, diapers, blankets and other similar items to try to protect the upholstery.

U.S. Pat. No. 2,746,203 to J. A. Gibas on May 22, 1956 shows a chair shoe that is placed on a chair leg to reduce damage to a wall against which the chair might rub. The shoe keeps the chair away from the wall.

U.S. Pat. No. 3,669,490 to Doris Y. Bertolet on June 13, 1972 discloses a padded rocker channel that either lies flat for the rocker portion of the chair to rock on or the channel may be attached to the rocker portion of the chair.

U.S. Pat. No. 4,285,543 to Chester V. Clark on Aug. 25, 1981 shows a rocker attachment for a folding lawn chair to modify the chair into a rocking chair. The chair snaps into clips on the rocker attachment.

European Patent No. 0 270 035 to Frankonia Kinderaus. GMBH & Co. on June 8, 1988 describes a pad that rests on a vehicle seat surface but is not attached to the child seat. The child seat rests on the pad. The pad may be wedge-shaped so that the child seat will be angled away from the leading edge of a vehicle seat.

SUMMARY OF THE INVENTION

The present invention is a protective apparatus for the legs or bottom of a conventional child restraint seat such as is used to seat a small child while the child is being transported in a vehicle. The protective apparatus may be made of a resilient material and attaches to the metal frame of a child restraint seat to protect the vehicles upholstery.

The apparatus is comprised of two main parts, a U-shaped base with C-shaped arms that form the U-shape. The opening of the C-shaped arms may run nearly the full length of the C-shaped arms. The small remaining portion of the arms at the extreme ends of the U-shape may not be open in order to secure the legs of the child restraint seat within the channel longitudinally. The C-shaped arms form a channel into which is inserted the legs of the child restraint seat. The channel is shown as round to receive round-shaped legs but the channel could be shaped to receive legs of other configurations. The C-shaped arms have a substantially flat bottom portion for stability. The opposing ends of the C-shaped arms are spread apart and the legs of the child restraint seat are inserted through the open portion of the C-shaped arms and then the arms snugly enclose the legs. There are provided fastening means such as straps with buckles, quick-disconnect buckle straps or hook and mesh type fastener straps such as VELCRO, a registered trademark for a hook and mesh type fastener. The U-shaped base may be inserted into a receiving base, somewhat U-shaped, which has a bottom wall and three C-shaped side walls that accept and align with the C-shaped arms of the U-shaped base. The bottom of the U-shaped base rests on the bottom wall of the receiving base which in turn rests on the vehicular seat. The receiving base may also be used to receive a base of a child restraint seat that may have a differently configured base in the situation where the upholstery of the vehicle needs protection from a child restraint seat other then that to which the U-shaped base is attached.

The U-shaped base and the receiving base are provided with a nonskid outer surface to increase the coefficient of friction between the base and the surface against which it is placed to reduce undesired sliding. When the receiving base is used, the child restraint seat may be removed from the vehicle and used to carry the child and the receiving base left in the vehicle. Upon return to the vehicle, the child restraint seat with its U-shaped base may be placed back into the receiving base.

A protective apparatus for a child restraint seat has a first base with three sequentially connected C-shaped arms and a channel formed within the C-shaped arms to receive a portion of the legs of the child restraint seat. There is a longitudinally oriented opening in the C-shaped arms allowing access to the channel.

There is a second base having a bottom wall and three sequentially connected side walls connected to the bottom wall forming a chamber to receive the first base. The side walls have an overhanging lip to secure the first base within the chamber and there is an entrance port in the second base that allows the first base to be placed within the chamber.

The protective apparatus may have three sequentially connected C-shaped arms that form substantially a U-shape and the opening in the sequentially connected C-shaped arms may extend less than the full length of the sequentially connected C-shaped arms to secure the portion of the legs of the child restraint seat within the channel longitudinally. The first base may have a bottom support attached to the C-shaped arms and a plurality of fastening means on the C-shaped arms to secure the portion of the legs of the child restraint seat within the channel. The first base may also have an outer surface with a high coefficient of friction. The second base may have an outer surface with a high coefficient of friction.

It is therefore an object of this invention to provide a protective apparatus that has a first base that may be secured to the legs of a child restraint seat to protect the upholstery of a vehicle from unsightly wear or damage.

It is another object of this invention to provide a protective apparatus that has a second base into which the first base or a base of another type already attached to a child restraint seat may be inserted in order that the child restraint seat with the first base attached may be removed from the vehicle leaving the second base in the vehicle for convenience.

BRIEF DESCRIPTION OF THE DRAWINGS

FIG. 1 is perspective view of a typical child restraint seat showing the legs of the seat placed and secured into the channel of the C-shaped arms of the first base and FIG. 2 is a top view of the first base showing the fastening means secured.

FIG. 3 is a cross-sectional view along line 3—3 showing the C-shape of the arms of the first base and the channel formed therein.

FIG. 4 is a perspective view of the second base showing the side walls with the overhanging lip and the bottom wall and the chamber formed therein.

FIG. 5 is a perspective fragmented sectional view of the first base showing one of the fastening means unsecured.

DESCRIPTION OF THE PREFERRED EMBODIMENT

A protective apparatus 10 for a child restraint seat 100 has a first base 11 with three sequentially connected C-shaped arms 12 forming substantially a U-shape as shown in FIGS. 1,2,3, and 5. There is a channel 13 formed within the C-shaped arms 12 to receive a portion of the legs 101 of the child restraint seat 100. There is a longitudinally oriented opening 14 in the C-shaped arms 12 that allows access to the channel 13. The opening 14 extends less than the full length of the sequentially connected C-shaped arms to secure a portion of the legs 101 of the child restraint seat 100 within the channel 13 longitudinally. A bottom support 15 is attached to the C-shaped arms 12. There are a plurality of fastening means 16 on the C-shaped arms 12 to secure a portion of the legs 101 of the child restraint seat 100 within the channel 13.

A second base 17, shown in FIG. 4, of the protective apparatus 10 has a bottom wall 18 and three sequentially connected side walls 19 connected to the bottom wall 18 forming a chamber 20 to receive the first base 11. The side walls 19 have an overhanging lip 21 to secure the first base 11 within the chamber 20. There is an entrance port 22 in the second base 17 that allows the first base 11 to be placed within the chamber 20. The first base 11 has an outer surface 23 with a high coefficient of friction to reduce slippage on whatever surface with which it might be in contact. The second base 17 has an outer surface 24 with a high coefficient of friction to reduce slippage on whatever surface with which it might be in contact.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A protective apparatus for a child restraint seat comprising:
   a. a first base with three sequentially connected C-shaped arms;
   b. a channel formed within the C-shaped arms to receive a portion of the legs of the child restraint seat;
   c. a longitudinally oriented opening in the C-shaped arms allowing access to the channel;
   d. a second base having a bottom wall and three sequentially connected side walls connected to the bottom wall forming a chamber to receive the first base;
   e. the side walls having an overhanging lip to secure the first base within the chamber; and
   f. an entrance port in the second base allowing the first base to be placed within the chamber.

2. A protective apparatus as defined in claim 1 wherein the three sequentially connected C-shaped arms form substantially a U-shape.

3. A protective apparatus as defined in claim 1 wherein the opening in the sequentially connected C-shaped arms extends less than the full length of the sequentially connected C-shaped arms to secure the portion of the legs of the child restraint seat within the channel longitudinally.

4. A protective apparatus as defined in claim 1 wherein the first base further comprises a bottom support attached to the C-shaped arms.

5. A protective apparatus as defined in claim 1 wherein the first base further comprises a plurality of fastening means on the C-shaped arms to secure the portion of the legs of the child restraint seat within the channel.

6. A protective apparatus for a child restraint seat comprising:
   a. a first base with three sequentially connected C-shaped arms;
   b. a channel formed within the C-shaped arms to receive a portion of the legs of the child restraint seat;
   c. a longitudinally oriented opening in the C-shaped arms allowing access to the channel;
   d. the opening extending less than the full length of the sequentially connected C-shaped arms to secure the portion of the legs of the child restraint seat within the channel longitudinally;
   e. a bottom support attached to the C-shaped arms;
   f. a plurality of fastening means on the C-shaped arms to secure the portion of the legs of the child restraint seat within the channel;
   g. a second base having a bottom wall and three sequentially connected side walls connected to the bottom wall forming a chamber to receive the first base;
   h. the side walls having an overhanging lip to secure the first base within the chamber; and
   i. an entrance port in the second base allowing the first base to be placed within the chamber.

7. A protective apparatus as defined in claim 1 wherein the first base further comprises an outer surface with a high coefficient of friction.

8. A protective apparatus as defined in claim 1 wherein the second base further comprises an outer surface with a high coefficient of friction.

9. A protective apparatus for a child restraint seat comprising:
   a. a first base with three sequentially connected C-shaped arms forming substantially a U-shape;
   b. a channel formed within the C-shaped arms to receive a portion of the legs of the child restraint seat;
   c. a longitudinally oriented opening in the C-shaped arms allowing access to the channel;
   d. the opening extending less than the full length of the sequentially connected C-shaped arms to secure the portion of the legs of the child restraint seat within the channel longitudinally;
   e. a bottom support attached to the C-shaped arms;
   f. a plurality of fastening means on the C-shaped arms to secure the portion of the legs of the child restraint seat within the channel;

g. a second base having a bottom wall and three sequentially connected side walls connected to the bottom wall forming a chamber to receive the first base;

h. the side walls having an overhanging lip to secure the first base within the chamber;

i. an entrance port in the second base allowing the first base to be placed within the chamber;

j. the first base having an outer surface with a high coefficient of friction; and k. the second base having an outer surface with a high coefficient of friction.

* * * * *